United States Patent
Tsuzuki et al.

(10) Patent No.: US 8,376,908 B2
(45) Date of Patent: Feb. 19, 2013

(54) VEHICLE CONTROL APPARATUS

(75) Inventors: Yukihisa Tsuzuki, Kariya (JP); Yosuke Makino, Anjo (JP); Tomoko Yamamoto, Chiryu (JP); Tomoyuki Kitagawa, Anjo (JP)

(73) Assignee: Aisin Seiki Kabushiki Kaisha, Kariya-shi, Aichi-Ken (JP)

( * ) Notice: Subject to any disclaimer, the term of this patent is extended or adjusted under 35 U.S.C. 154(b) by 220 days.

(21) Appl. No.: 12/893,284

(22) Filed: Sep. 29, 2010

(65) Prior Publication Data

US 2011/0098154 A1    Apr. 28, 2011

(30) Foreign Application Priority Data

Oct. 23, 2009  (JP) ................................ 2009-244854

(51) Int. Cl.
F16H 61/48    (2006.01)
(52) U.S. Cl. .......................................... 477/54; 477/181
(58) Field of Classification Search .............. 477/52–54, 477/57, 58, 62, 64, 168, 169, 173, 174, 180, 477/181
See application file for complete search history.

(56) References Cited

U.S. PATENT DOCUMENTS

| 5,305,213 | A  | * | 4/1994 | Boardman et al. ............ 701/54 |
| 5,720,358 | A  | * | 2/1998 | Christensen et al. ........ 180/53.4 |
| 2008/0154469 | A1 |   | 6/2008 | Whitmer |
| 2008/0227597 | A1 | * | 9/2008 | Povirk et al. .................... 477/62 |
| 2011/0011689 | A1 | * | 1/2011 | Sakamoto ....................... 192/3.3 |

FOREIGN PATENT DOCUMENTS

JP    2009-115308 A    5/2009

* cited by examiner

*Primary Examiner* — Justin Holmes
(74) *Attorney, Agent, or Firm* — Buchanan Ingersoll & Rooney

(57) ABSTRACT

A vehicle control apparatus that controls a vehicle having a torque converter provided on a power transmission path between an internal combustion engine and a transmission is provided. The torque converter includes a pump impeller, to which rotational power from the internal combustion engine is input to rotate, a turbine runner that receives oil from the rotating pump impeller and transmits the rotational power toward the transmission, and an impeller clutch that is configured to connect and disconnect the rotational power transmission from the internal combustion engine to the pump impeller. The vehicle control apparatus controls the internal combustion engine and the impeller clutch, such that, when a throttle opening degree is equal to or larger than a first threshold value during control of the impeller clutch from a non-engaged state to a completely engaged state, lowers an output torque of the internal combustion engine.

6 Claims, 5 Drawing Sheets

VEHICLE CONTROL APPARATUS

CROSS REFERENCE TO RELATED APPLICATIONS

This application is based on and claims priority under 35 U.S.C. §119 to Japanese Patent Application 2009-244854, filed on Oct. 23, 2009, the entire content of which is incorporated herein by reference.

TECHNICAL FIELD

This disclosure relates to a vehicle control apparatus that controls a vehicle having a clutch provided on a power transmission path between an internal combustion engine and a torque converter, and more particularly, to a vehicle control apparatus that controls the internal combustion engine and the torque converter at the time of start moving.

BACKGROUND DISCUSSION

In an automatic transmission, a torque converter capable of continuously transmitting torque of a power source from a stall state to a direct-coupled state is provided on a power transmission path between an internal combustion engine and a torque converter. There is a torque converter having a lock-up clutch that directly couples a pump impeller and a turbine runner to remove a rotation number difference between the internal combustion engine and the turbine runner so as to improve a fuel efficiency during driving when a rotation number difference between the pump impeller and the turbine runner is small. Further, among such torque converters, there is a torque converter having a mechanism (hereinafter, referred to as impeller clutch) that can separate the pump impeller from the internal combustion engine so as to reduce fluid resistance between the turbine runner and the pump impeller for the purpose of reducing fuel consumption during an idling.

Regarding control of such a vehicle having the impeller clutch in the torque converter, for example, JP-A-2009-115308 discloses a clutch operating method including, in order to achieve a turbo charge spool-up at the time of start moving, a step of increasing a first liquid pressure in an inside chamber from a first level to a second level, such that the first liquid pressure forces to move a clutch, which is provided between an engine of the vehicle and an impeller for a torque converter of the vehicle, to a connection position, and a step of decreasing a second liquid pressure in an outside chamber from a third level to a fourth level as a function of an engine speed, such that the second liquid pressure corresponds to the first liquid pressure and the second liquid pressure in the outside chamber is decreased as a function of a throttle position of the engine.

When the torque converter having the impeller clutch is applied to a vehicle with no turbo lag, it is required to engage the impeller clutch in a short time at the time of start moving, so as to improve a response. However, when the clutch operating method disclosed in JP-A-2009-115308 is applied to the vehicle with no turbo lag, the impeller clutch is controlled to output maximum torque with respect to a throttle opening degree. Accordingly, when the throttle opening degree is large and torque generated in the internal combustion engine is very high, a large torque fluctuation is transferred to the power transmission path of a rear side (transmission side) from the torque converter, so that shock is generated.

A need thus exists for a vehicle control apparatus that avoids shock being generated even when an impeller clutch is engaged in a short time in a vehicle with no turbo lag.

SUMMARY

According to an aspect of this disclosure, there is provided A vehicle control apparatus that controls a vehicle having a torque converter provided on a power transmission path between an internal combustion engine and a transmission. The torque converter includes a pump impeller, to which rotational power from the internal combustion engine is input to rotate, a turbine runner that receives oil from the rotating pump impeller and transmits the rotational power toward the transmission, and an impeller clutch that is configured to connect and disconnect the rotational power transmission from the internal combustion engine to the pump impeller. The vehicle control apparatus controls the internal combustion engine and the impeller clutch, such that, when a throttle opening degree is equal to or larger than a first threshold value during control of the impeller clutch from a non-engaged state to a completely engaged state, lowers an output torque of the internal combustion engine.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
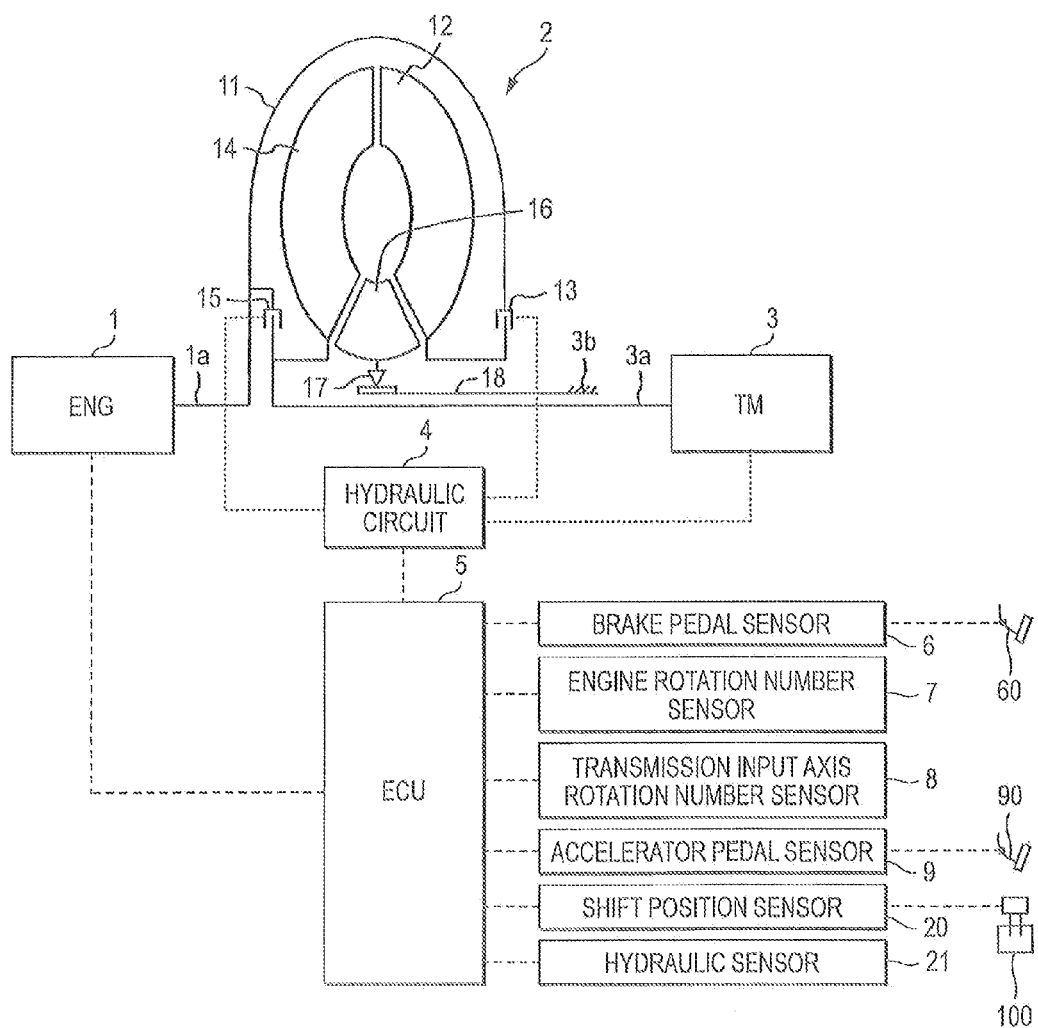
FIG. 1 schematically shows a configuration of a vehicle control apparatus according to an illustrative embodiment 1 disclosed here.

According to illustrative embodiments disclosed here, there is provided a vehicle control apparatus that controls a vehicle having a torque converter 2 (FIG. 1) provided on a power transmission path between an internal combustion engine 1 (FIG. 1) and a transmission 3 (FIG. 1). The torque converter includes a pump impeller 12 (FIG. 1), to which rotational power from the internal combustion engine is input to rotate, a turbine runner 14 (FIG. 1) that receives oil from the rotating pump impeller and transmits the rotational power toward the transmission, and an impeller clutch 13 (FIG. 1) that can connect and disconnect the rotational power transmission from the internal combustion engine to the pump impeller. The vehicle control apparatus controls the internal combustion engine and the impeller clutch, such that when a throttle opening degree or the rotation or an output torque of the internal combustion engine is equal to or larger than a preset threshold value during control of the impeller clutch from a non-engaged state to a completely engaged state, lowers the output torque of the internal combustion engine.

Illustrative Embodiment 1

A vehicle control apparatus according to an illustrative embodiment 1 disclosed here will be described with reference to the drawing. FIG. 1 schematically shows a configuration of the vehicle control apparatus according to the illustrative embodiment 1 disclosed here.

Referring to FIG. 1, the vehicle has a torque converter 2 provided on a power transmission path between an engine 1 and a transmission 3, a hydraulic circuit 4 that hydraulically controls engagement elements of the torque converter 2 and the transmission 3, and an electronic control unit 5 that electronically controls the engine 1 and the hydraulic circuit 4. The electronic control unit 5 is a vehicle control apparatus and controls actuators in the engine 1 to perform a torque down control and controls the hydraulic circuit 4 to control connection and disconnection of an impeller clutch 13 of the torque converter 2. Herein, the torque down control means a control of lowering the output torque of the engine 1.

The engine 1 is an internal combustion engine that burns fuel (for example, hydrocarbon-based fuel such as gasoline and diesel) to output rotational power from a crank shaft 1a. The rotational power of the crank shaft 1a is transmitted to a converter shell 11 of the torque converter 2. The engine 1 has a variety of sensors and actuators, is communicably connected to the electronic control unit 5 and is controlled by the electronic control unit 5.

The torque converter 2 is a fluid power transmission that uses a mechanical action of fluid to generate a torque amplification action by a rotation difference between a pump impeller 12 of an input side and a turbine runner 14 of an output side. The torque converter 2 is provided on a power transmission path between the crack shaft 1a and a transmission input axis 3a. The torque converter 2 has the converter shell 11, the pump impeller 12, an impeller clutch 13, the turbine runner 14, a lock-up clutch 15, a stator 16, a one-way clutch 17 and a stator shaft 18.

The converter shell 11 is a casing of the torque converter 2. The converter shell 11 is integrally rotated with the crank shaft 1a at all, times. Each constitutional unit of the torque converter 2 and oil are provided in the internal space of the converter shell 11. The converter shell 11 is configured to be rotatable relative to the pump impeller 12. However, the converter shell 11 is rotated integrally with the pump impeller 12 by being engaged with the impeller clutch 13. Further, the converter shell 11 is configured to be rotatable relative to the turbine runner 14. However, the converter shell 11 is rotated integrally with the turbine runner 14 by being engaged with the lock-up clutch 15.

The pump impeller 12 is an impeller that flows oil toward the turbine runner 14 by rotation. The pump impeller 12 is configured to be rotatable relative to the converter shell 11. However, the pump impeller 12 is rotated integrally with the converter shell 11 by being engaged with the impeller clutch 13.

The impeller clutch 13 is a clutch mechanism (friction engagement element) that separates the pump impeller 12 from the engine 1 so as to reduce fluid resistance between the turbine runner 14 and the pump impeller 12 for a purpose of reducing fuel consumption during an idling. The impeller clutch 13 is engaged, so that it transmits the rotational power of the converter shell 11 to the pump impeller 12. The connection and disconnection of the impeller clutch 13 is controlled by the electronic control unit 5 through the hydraulic circuit 4.

The turbine runner 14 is an impeller that receives oil flowed from the pump impeller 12 and is thus rotated. The turbine runner 14 is integrally rotated with the transmission input axis 3a at all times. The turbine runner 14 is configured to be rotatable relative to the converter shell 11. However, the turbine runner 14 is rotated integrally with the converter shell 11 by being engaged with the lock-up clutch 15.

The lock-up clutch 15 is a clutch mechanism (friction engagement element) that directly couples the pump impeller 12 and the turbine runner 14 to remove a rotation number difference between the engine 1 and the turbine runner 14 when a rotation number difference between the pump impeller 12 and the turbine runner 13 is small. The lock-up clutch 15 is engaged, so that it transmits the rotational power of the converter shell 11 to the turbine runner 14 and the transmission input axis 3a. The connection and disconnection of the lock-up clutch 15 is controlled by the electronic control unit 5 through the hydraulic circuit 4.

The stator 16 is an impeller that is provided at a position of an inner periphery between the turbine runner 14 and the pump impeller 12 and rectifies and causes the oil, which is discharged from the turbine runner 14, to reflow to the pump impeller 12, thereby generating a torque amplification action. The stator 16 is fixed to a transmission case 3b through the one-way clutch 17 and the stator shaft 18 and is configured to be rotated only in one direction.

The one-way clutch 17 is a clutch that causes the stator 16 to rotate only in one direction. A rotational end of the one-way clutch 17 is fixed with the stator 16. A fixing end of the one-way clutch 17 is fixed to the transmission case 3b through, the stator shaft 18.

The stator shaft 18 is a shaft-type member that fixes the fixing end of the one-way clutch 17 to the transmission case 3b.

The transmission 3 is a mechanism that changes and then outputs the rotational power, which is input from the transmission input axis 3a, toward a driving wheel (not shown). In the transmission 3, the rotational power output from the engine 1 is input to a planetary gear mechanism (a combination of planetary gear mechanisms) through the torque converter 2 and is changed and output by the planetary gear mechanism. The transmission 3 configures a plurality of shift stages in accordance with combinations of engagement and non-engagement of a plurality of friction engagement elements (clutch and brake; not shown). The connection and disconnection of each friction engagement element of the transmission 3 is controlled by the electronic control unit 5 through the hydraulic circuit 4.

The hydraulic circuit 4 is a circuit that controls the hydraulic pressure to be supplied to the friction engagement elements (including the impeller clutch 13 and the lock-up clutch 15) of the torque converter 2 and the transmission 3. The hydraulic circuit 4 is configured to switch oil paths (not shown) by a valve (not shown), and has a plurality of electronic valves (not shown), which are driven by a control signal from the electronic control unit 5. The electronic valves control a line pressure supplied from the oil pump to switch the oil paths or to control the engagement and opening (non-engagement) of the friction engagement elements (including the impeller clutch 13 and the lock-up clutch 15) of the torque converter 2 and the transmission 3.

The electronic control unit 5 is a computer that controls operations of the friction engagement elements (including the impeller clutch 13 and the lock-up clutch 15) of the torque converter 2 and the transmission 3 through the hydraulic circuit 4. The electronic control unit 5 is communicably connected to a brake pedal sensor 6, an engine rotation number sensor 7, a transmission input axis rotation number sensor 8 an accelerator pedal sensor 9, a shift position sensor 20, and a hydraulic sensor 21. The electronic control unit 5 detects vehicle states (a pedaled degree of a brake, the engine rotation number, the transmission input axis rotation number, an opening degree of the accelerator and the like) based on detection signals from the various sensors and control signals of the various actuators (including the electronic valves). The electronic control unit 5 transmits a control signal that controls the output (the rotation number, torque) of the engine 1, based on stored programs and database (maps, threshold values), in response to the vehicle states. The electronic control unit 5 transmits a control signal that controls the electronic valves (not shown) of the hydraulic circuit 4, so as to control the change of speed of the transmission 3 or the connection and disconnection of the impeller clutch 13 and the lock-up clutch 15 based on the stored programs and database (maps, threshold values), in response to the vehicle states. The detailed control operation of the electronic control unit 5 will be described below.

The brake pedal sensor 6 is a sensor that detects a pedaling stroke of a brake pedal 60 in a driver space and functions as a start intention detection sensor that detects a driver's intention to start the vehicle. The brake pedal sensor 6 detects that there is a driver's intention to start the vehicle when the pedaling of the brake pedal 60 is released. The brake pedal sensor 6 is communicably connected to the electronic control unit 5.

It is noted that a shift position sensor 20 that detects a shift position of a shift lever 100, such as L range, R range, N range, P range and D range, or the accelerator pedal sensor 9 may be used as the start intention detection sensor instead of the brake pedal sensor 6. The shift position sensor 20 detects that there is a driver's intention to start the vehicle when the shift lever 100 is shifted to the D range from the N range, for example. The accelerator pedal sensor 9 detects that there is a driver's intention to start the vehicle when an accelerator pedal 90 is stepped on. Meanwhile, a driver's intention to start the vehicle may be determined with a plurality of sensors, rather than one sensor only.

The engine rotation number sensor 7 is a sensor that detects the rotation number of the crank shaft 1a of the engine 1 (engine rotation number). The engine rotation number sensor 7 is communicably connected to the electronic control unit 5.

The transmission input axis rotation number sensor 8 is a sensor that detects the rotation number of the transmission input axis 3a (transmission input axis rotation number). The transmission input axis rotation number sensor 8 is communicably connected to the electronic control unit 5.

The accelerator pedal sensor 9 is a sensor that detects a pedaling stroke of an accelerator pedal 90 in a driver's space to thus detect a throttle opening degree. The transmission input axis rotation number sensor 8 is communicably connected to the electronic control unit 5.

Figure 2:
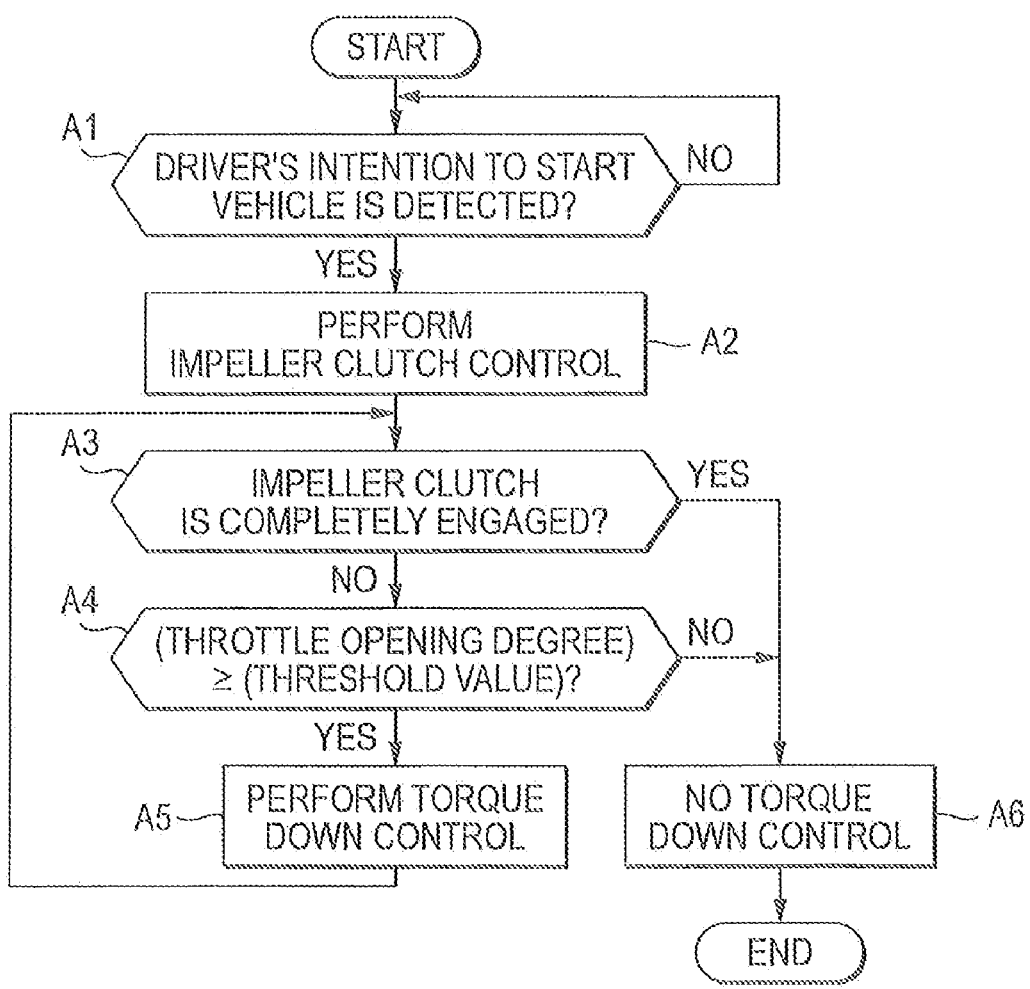
FIG. 2 is a flow chart that schematically shows an operation of the vehicle control apparatus according to the illustrative embodiment 1 disclosed here.

Next, an operation of the vehicle control apparatus according to the illustrative embodiment 1 disclosed here will be described with reference to the drawing. FIG. 2 is a flow chart that schematically shows the operation of the vehicle control apparatus according to the illustrative embodiment 1 disclosed here. It is assumed, at the time start moving, that the vehicle is stopped, the engine 1 is being rotating and the impeller clutch 13 and the lock-up clutch 15 are opened.

First, the electronic control unit 5 determines whether a driver's intention to start the vehicle is detected using the start intention detection sensor (brake pedal sensor 6 in FIG. 1) (step A1). When a driver's intention to start the vehicle is not detected (NO in step A1), the operation returns to step A1.

When a driver's intention to start the vehicle is detected (YES in step A1), the electronic control sensor 5 performs the control of shifting the impeller clutch 13 from an opened state to an engaged state (step A2).

Following step A2 or step A5, the electronic control unit 5 determines whether the impeller clutch 13 is completely engaged (step A3). When the impeller clutch 13 is completely engaged (YES in step A3), the operation proceeds to step A6 with the impeller clutch 13 being completely engaged.

Herein, the determination of whether the impeller clutch 13 is completely engaged is made based on a determination of whether a difference between the engine rotation number, which is detected by the engine rotation number sensor 7 in FIG. 1, and the transmission input axis rotation number, which is detected by the transmission input axis rotation number sensor 8, is removed (or the difference becomes equal to or less than a threshold value). When the difference is removed, it is determined that the impeller clutch 13 is completely engaged.

It is noted that the configuration for determining whether the impeller clutch 13 is completely engaged is not limited to the above-described configuration of determination based on the engine rotation number sensor 7 and the transmission input axis rotation number sensor 8. For example, whether the impeller clutch 13 is completely engaged may be determined, using a detection signal of a hydraulic sensor 21 that detects a hydraulic pressure causing the impeller clutch 13 to be engaged or a control signal (relating to the impeller clutch 13) for the hydraulic circuit 4 of the electronic control unit 5.

When the impeller clutch 13 is not completely engaged (NO in step A3), the electronic control unit 5 determines whether the throttle opening degree, which a driver requests, is equal to or larger than a preset threshold value, using the accelerator pedal sensor 9 (step A4). When the throttle opening degree is smaller than the preset threshold value (NO in step A4), the operation proceeds to step A6.

When the throttle opening degree is equal to or larger than the preset threshold value (YES in step A4), the electronic control unit 5 performs the torque down control for the engine 1 (starts the torque down control when the torque down control is not performed or continues the torque down control when the torque down control has been already performed) (step A5) so as to reduce the shock when the impeller clutch 13 is engaged, and then returns to step A3.

When the impeller clutch 13 is completely engaged (YES in step A3) or when the throttle opening degree is smaller than the preset threshold value (NO in step A4), the shock is not problematic which is generated when the impeller clutch 13 is engaged. Therefore, the electronic control unit 5 does not perform the torque down control for the engine 1 (maintain not performing the torque down control when the torque down control is not performed, or stops the torque down control when the torque down control has been already performed) (step A6) and then ends the process.

According to the illustrative embodiment 1, while the impeller clutch 13 is rapidly engaged so as to suppress the time lag at the time of start moving, the engine 1 is subject to the torque down control when the throttle opening degree is great. Thus, the shock transfer to the transmission 3 is suppressed. Accordingly, the rapid engagement of the impeller clutch 13 is possible, so that it is possible to reduce the time lag at the time of start moving.

Illustrative Embodiment 2

Figure 3:
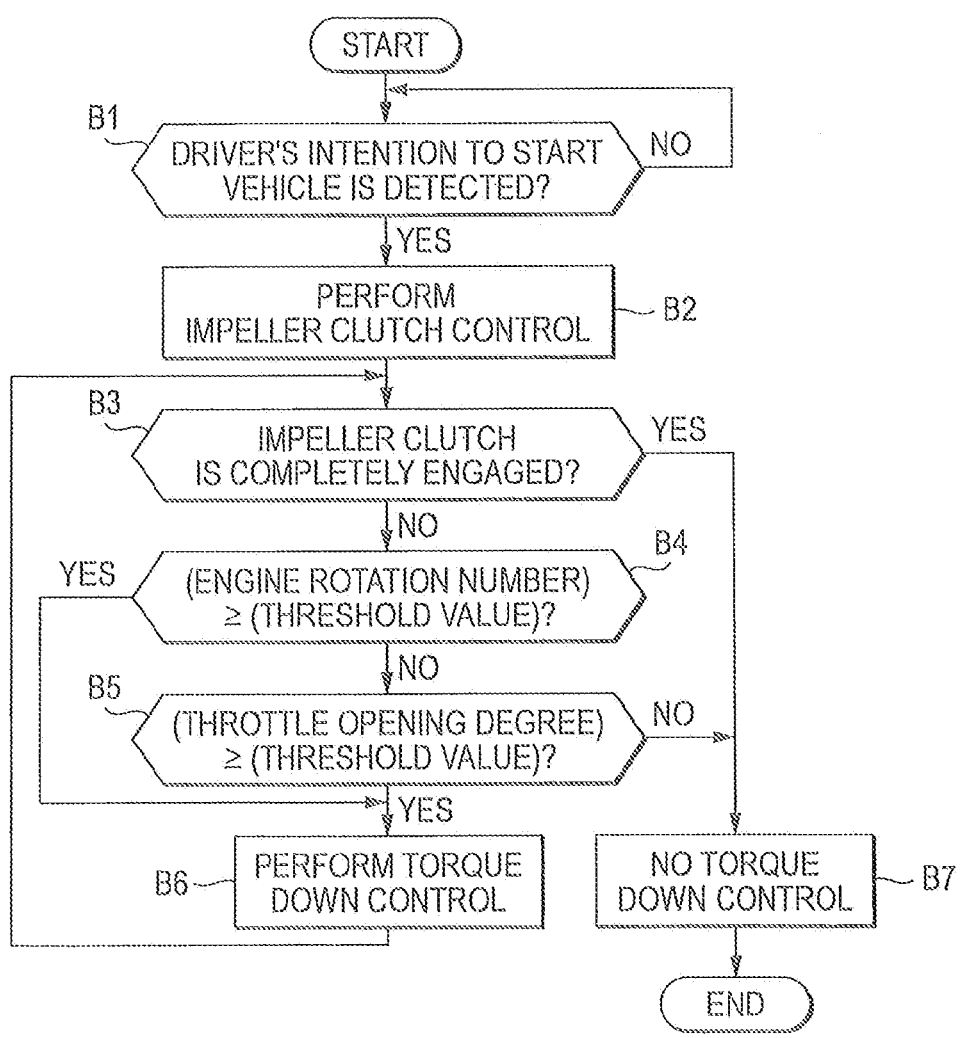
FIG. 3 is a flow chart that schematically shows an operation of a vehicle control apparatus according to an illustrative embodiment 2 disclosed here.

A vehicle control apparatus according to an illustrative embodiment 2 disclosed here will be described with reference to the drawing. FIG. 3 is a flow chart that schematically shows an operation of the vehicle control apparatus according to the illustrative embodiment 2 disclosed here.

In the illustrative embodiment 2, step B4 of determining whether the engine rotation number is equal to or larger than a preset threshold value, using the engine rotation number sensor 7 (FIG. 1), is added between step B3 and step B5, which correspond to step A3 and step A4 of the illustrative embodiment 1. In other words, steps B1 to B3 are the same as steps A1 to A3. When the impeller clutch 13 is not completely engaged (NO in step B3), the electronic control unit 5 determines whether the engine rotation number is equal to or larger than a preset threshold value, using the engine rotation number sensor 7 (step B4). When the engine rotation number is equal to or larger than the preset threshold value (YES in step B4), the operation proceeds to step B6. When the engine rotation number is smaller than the preset threshold value, the operation proceeds to step B5. Steps B5 to B7 are the same as steps A4 to A7 in FIG. 2. It is noted that, the configuration of the illustrative embodiment 2 is similar to that of the illustrative embodiment 1 (refer to FIG. 1).

According to the illustrative embodiment 2, the same effects as those of the illustrative embodiment 1 are obtained.

Illustrative Embodiment 3

Figure 4:
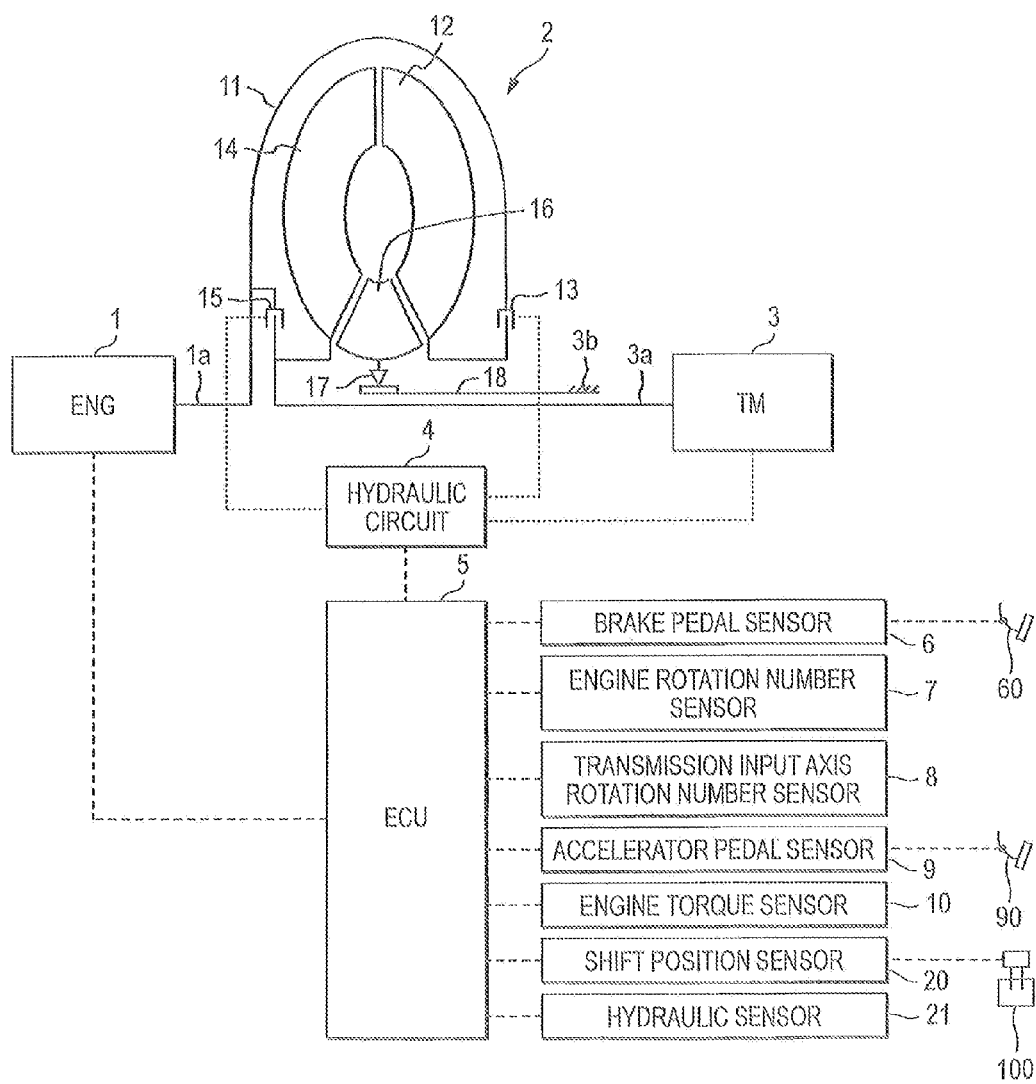
FIG. 4 schematically shows a configuration of a vehicle control apparatus according to an illustrative embodiment 3 disclosed here.
Figure 5:
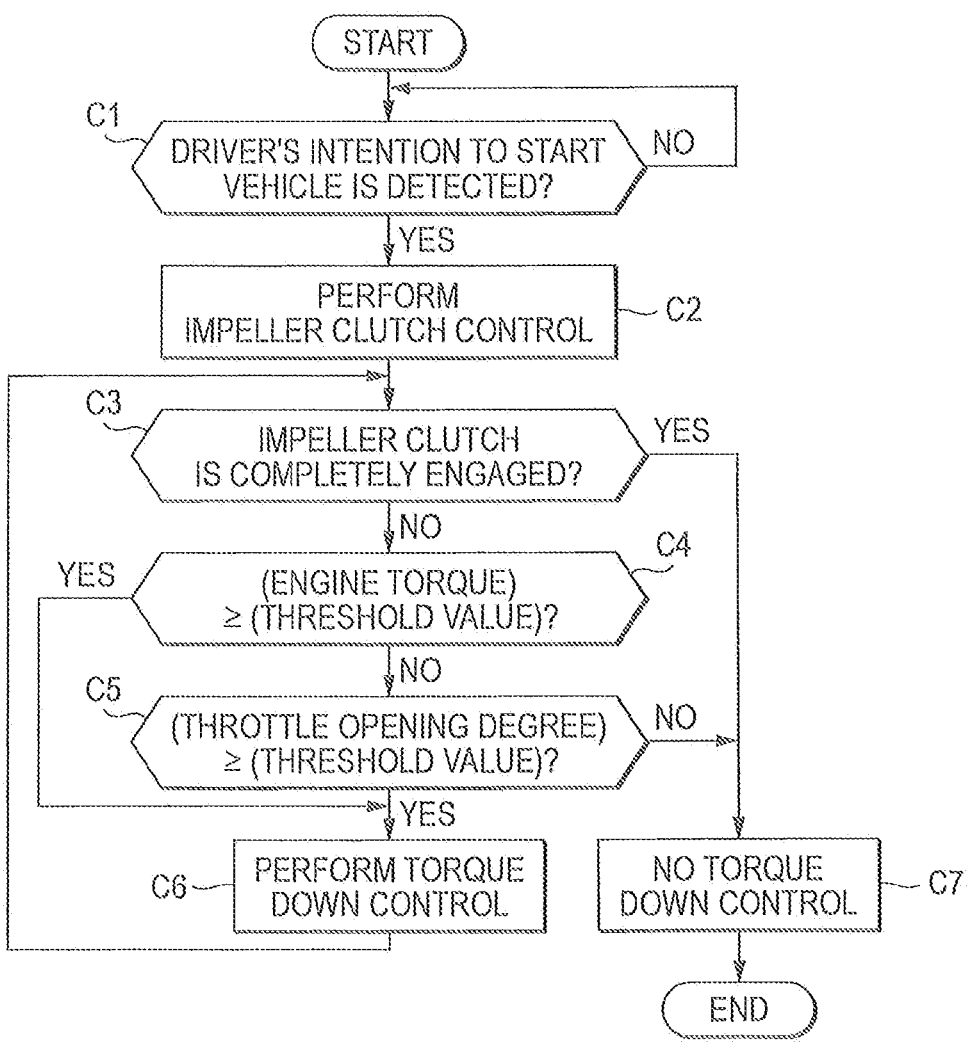
FIG. 5 is a flow chart that schematically shows an operation of the vehicle control apparatus according to the illustrative embodiment 3 disclosed here.

A vehicle control apparatus according to an illustrative embodiment 3 disclosed here will be described with reference to the drawing. FIG. 4 schematically shows a configuration of a vehicle control apparatus according to an illustrative embodiment 3 disclosed here. FIG. 5 is a flow chart that schematically shows an operation of the vehicle control apparatus according to the illustrative embodiment 3 disclosed here.

In the illustrative embodiment 3 that is a modified embodiment of the illustrative embodiment 2, an engine torque sensor 10 (refer to FIG. 4) is added to the vehicle control apparatus of the illustrative embodiment 2 (which is similar to the vehicle control apparatus of the illustrative embodiment 1; refer to FIG. 1) and step C4 of determining whether the engine torque is equal to or larger than a preset threshold value, using the engine torque sensor 10 (refer to FIG. 5) is performed, instead of step B4 of determining whether the engine rotation number is equal to or larger than a preset threshold value in the operation (refer to FIG. 3) of the vehicle control apparatus of the illustrative embodiment 2. The engine torque sensor 10 is a sensor that detects the output torque (engine torque) of the engine 1. The engine torque sensor 10 is communicably connected to the electronic control unit 5. In the operation of the vehicle control apparatus, steps C1 to C3 are the same as steps B1 to B3 of FIG. 3. When the impeller clutch 13 is not completely engaged (NO in step C3), the electronic control unit 5 determines whether the engine torque is equal to or larger than a preset threshold value, using the engine torque sensor 10 (step C4). When the engine torque is equal to or larger than a preset threshold value (YES in step C4), the operation proceeds to step C6. When the engine torque is smaller than the preset threshold value (NO is step C4), the operation proceeds to step C5. Steps C5 to C7 are the same as steps B5 to B7 of FIG. 3.

According to the illustrative embodiment 3, the same effects as those of the illustrative embodiment 2 are obtained.

It is provided illustrative, non-limiting embodiments as follows:

A vehicle control apparatus controls a vehicle having a torque converter provided on a power transmission path between an internal combustion engine and a transmission. The torque converter includes a pump impeller, to which rotational power from the internal combustion engine is input to rotate, a turbine runner that receives oil from the rotating pump impeller and transmits the rotational power toward the transmission, and an impeller clutch that is configured to connect and disconnect the rotational power transmission from the internal combustion engine to the pump impeller. The vehicle control apparatus controls the internal combustion engine and the impeller clutch, such that, when a throttle opening degree is equal to or larger than a first threshold value during control of the impeller clutch from a non-engaged state to a completely engaged state, lowers an output torque of the internal combustion engine.

In the above vehicle control apparatus, when a rotation number or the output torque of the internal combustion engine is equal to or larger than a second threshold value during the control of the impeller clutch from the non-engaged state to the completely engaged state, the vehicle control apparatus may lower the output torque of the internal combustion engine.

In the above vehicle control apparatus, the completely engaged state of the impeller clutch may be detected by an internal combustion engine rotation number sensor that detects a rotation number of the internal combustion engine and a transmission input axis rotation number sensor that detects a rotation number to be input to the transmission.

The above vehicle control apparatus may control the impeller clutch through a hydraulic circuit. The completely engaged state of the impeller clutch may be detected by a hydraulic sensor that detects a hydraulic pressure to be supplied to the impeller clutch, in the hydraulic circuit.

In the above vehicle control apparatus, the completely engaged state of the impeller clutch may be detected by a control signal for the impeller clutch.

In the vehicle control apparatus, the vehicle control apparatus may start to control the impeller clutch from the non-engaged state to the completely engaged state when detecting a driver's intention to start the vehicle.

In the above vehicle control apparatus, the driver's intention to start the vehicle may be detected based on at least one operation of a brake pedal, an accelerator pedal and a shift lever.

According to the above-described configuration, while the impeller clutch is rapidly engaged so as to suppress a time lag at the time of starting a vehicle, the control (torque down control) of lowering the output torque of the internal combustion engine is performed when the throttle opening degree is great, so that the shock transfer to the transmission is suppressed. Thus, the rapid engagement of the impeller clutch is possible, so that it is possible to reduce the time lag at the time of start moving.

The principles, preferred embodiment and mode of operation of the present invention have been described in the foregoing specification. However, the invention which is intended to be protected is not be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within spirit and scope of the present invention as defined in the claims, be embraced thereby.

What is claimed is:

1. A vehicle control apparatus that controls a vehicle having a torque converter provided on a power transmission path between an internal combustion engine and a transmission, wherein the torque converter includes a pump impeller, to which rotational power from the internal combustion engine is input to rotate, a turbine runner that receives oil from the rotating pump impeller and transmits the rotational power toward the transmission, and an impeller clutch that is configured to connect and disconnect the rotational power transmission from the internal combustion engine to the pump impeller, wherein the vehicle control apparatus controls the internal combustion engine and the impeller clutch such that when a throttle opening degree is equal to or larger than a first threshold value during control of the impeller clutch from a non-engaged state to a completely engaged state, an output torque of the internal combustion engine is lowered, and wherein the vehicle control apparatus controls the internal combustion engine such that when a rotation number or the output torque of the internal combustion engine is equal to or larger than a second threshold value during the control of the impeller clutch from the non-engaged state to the completely engaged state, the output torque of the internal combustion engine is lowered.

2. The vehicle control apparatus according to claim 1,
wherein the completely engaged state of the impeller clutch is detected by an internal combustion engine rotation number sensor that detects a rotation number of the internal combustion engine and a transmission input axis rotation number sensor that detects a rotation number to be input to the transmission.

3. The vehicle control apparatus according to claim 1,
wherein the vehicle control apparatus controls the impeller clutch through a hydraulic circuit, and
wherein the completely engaged state of the impeller clutch is detected by a hydraulic sensor that detects a hydraulic pressure to be supplied to the impeller clutch, in the hydraulic circuit.

4. The vehicle control apparatus according to claim 1,
wherein the completely engaged state of the impeller clutch is detected by a control signal for the impeller clutch.

5. The vehicle control apparatus according to claim 1,
wherein the vehicle control apparatus starts to control the impeller clutch from the non-engaged state to the completely engaged state when detecting a driver's intention to start the vehicle.

6. The vehicle control apparatus according to claim 1,
wherein the driver's intention to start the vehicle is detected based on at least one operation of a brake pedal, an accelerator pedal and a shift lever.

* * * * *